(12) United States Patent
Jung et al.

(10) Patent No.: US 9,711,992 B2
(45) Date of Patent: Jul. 18, 2017

(54) DISPLAY DEVICES, WIRELESS CHARGING SYSTEM INCLUDING DISPLAY DEVICES, AND METHODS OF OPERATING THE DISPLAY DEVICES

(71) Applicant: Samsung Electronics Co., Ltd., Suwon-Si, Gyeonggi-Do (KR)

(72) Inventors: Myoung-hoon Jung, Bucheon-si (KR); Jung-woo Kim, Hwaseong-si (KR); Young-Jun Yun, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 129 days.

(21) Appl. No.: 14/180,501

(22) Filed: Feb. 14, 2014

(65) Prior Publication Data
US 2014/0232325 A1   Aug. 21, 2014

(30) Foreign Application Priority Data
Feb. 15, 2013  (KR) .................. 10-2013-0016591

(51) Int. Cl.
| H02J 7/00 | (2006.01) |
| H02J 7/02 | (2016.01) |
| G06F 3/041 | (2006.01) |
| G09G 3/36 | (2006.01) |
| H02J 17/00 | (2006.01) |

(Continued)

(52) U.S. Cl.
CPC .......... *H02J 7/025* (2013.01); *G06F 1/1637* (2013.01); *G06F 1/1643* (2013.01); *G06F 1/26* (2013.01); *G06F 1/263* (2013.01); *G06F 3/0412* (2013.01); *G09G 3/3648* (2013.01); *G09G 3/3655* (2013.01); *H01H 36/00* (2013.01); *H02J 7/0047* (2013.01); *H02J 17/00* (2013.01); *G09G 2330/00* (2013.01); *Y10T 307/391* (2015.04); *Y10T 307/826* (2015.04)

(58) Field of Classification Search
USPC ........................................ 320/107
See application file for complete search history.

(56) References Cited

U.S. PATENT DOCUMENTS

| 9,559,405 B2 | 1/2017 | Sorrell et al. |
| 2008/0036720 A1 | 2/2008 | Foo et al. |

(Continued)

FOREIGN PATENT DOCUMENTS

| KR | 20090019308 A | 2/2009 |
| KR | 2012-0027505 A | 3/2012 |

(Continued)

OTHER PUBLICATIONS

European Search Report dated May 27, 2014 for corresponding European Application No. 14154972.5.

(Continued)

*Primary Examiner* — Bryce Aisaka
(74) *Attorney, Agent, or Firm* — Harness, Dickey & Pierce, P.L.C.

(57) ABSTRACT

A display device includes a display panel including at least one electrode, and a panel driving unit configured to drive the display panel. The display device further includes a power storage unit configured to store received power, and a switching unit configured to electrically connect the at least one electrode to one of the panel driving unit and the power storage unit.

20 Claims, 13 Drawing Sheets

(51) Int. Cl.
*H01H 36/00* (2006.01)
*G06F 1/16* (2006.01)
*G06F 1/26* (2006.01)

(56) References Cited

U.S. PATENT DOCUMENTS

| | | |
|---|---|---|
| 2010/0315389 A1 | 12/2010 | Sorrell et al. |
| 2011/0074352 A1* | 3/2011 | Huynh .............. H02M 3/33523 320/111 |
| 2011/0205168 A1 | 8/2011 | Jun |
| 2012/0038317 A1* | 2/2012 | Miyamoto .............. H02J 7/025 320/108 |
| 2014/0015337 A1 | 1/2014 | Takeuchi et al. |
| 2014/0139038 A1* | 5/2014 | Konno .................. B60L 3/0069 307/104 |
| 2015/0048752 A1* | 2/2015 | Van Den Brink ...... H02J 5/005 315/246 |
| 2015/0091512 A1* | 4/2015 | Mai ........................ H02J 5/005 320/108 |

FOREIGN PATENT DOCUMENTS

| | | |
|---|---|---|
| WO | WO-2012037444 A2 | 3/2012 |
| WO | WO-2012086411 A1 | 6/2012 |
| WO | WO-2012132929 A1 | 10/2012 |

OTHER PUBLICATIONS

Special Report. *TTA Journal*, vol. 138, pp. 45-51. 2011.
Waffenshcmidt et al. "Wireless power for mobile devices." *Intelec*, 2011.
Examination Report for corresponding European Application No. 14 154 972.5 dated Aug. 3, 2016.

\* cited by examiner

DISPLAY DEVICES, WIRELESS CHARGING SYSTEM INCLUDING DISPLAY DEVICES, AND METHODS OF OPERATING THE DISPLAY DEVICES

CROSS-REFERENCE TO RELATED APPLICATIONS

This application claims the benefit of Korean Patent Application No. 10-2013-0016591, filed on Feb. 15, 2013, in the Korean Intellectual Property Office, the disclosure of which is incorporated herein in its entirety by reference.

BACKGROUND

Field

At least one example embodiment relates to a display device charging wirelessly through a display panel, and/or a wireless charging system including the same.

Description of the Related Art

As the types of electronic devices carried by individuals are becoming diverse and the performance of portable devices evolve, charging a battery that supplies power to such electronic devices becomes a daily routine. As a technique to provide convenience in charging electronic devices, wireless charging techniques are desired.

SUMMARY

At least one example embodiment provides display devices charging wirelessly through a display panel, and/or wireless charging systems including the same, and/or methods of operating display devices.

According to at least one example embodiment, a display device includes a display panel including at least one electrode, and a panel driving unit configured to drive the display panel. The display device includes a power storage unit configured to store received power, and a switching unit configured to electrically connect the at least one electrode to one of the panel driving unit and the power storage unit.

According to at least one example embodiment, the at least one electrode is disposed as an outermost electrode among electrodes of the display panel.

According to at least one example embodiment, the at least one electrode includes a first electrode and a second electrode spaced apart from the first electrode.

According to at least one example embodiment, the at least one electrode is a common electrode configured to apply a common voltage to the display panel.

According to at least one example embodiment, the panel driving unit includes a voltage generating unit configured to apply a common voltage to the at least one electrode.

According to at least one example embodiment, the display panel is a touch screen, and the at least one electrode is a touch electrode configured to sense a touch on the touch screen.

According to at least one example embodiment, the panel driving unit is configured to sense a voltage change of the touch electrode to detect a position of the touch.

According to at least one example embodiment, the touch electrode includes a plurality of first electrode cells and a plurality of second electrode cells, the plurality of first electrode cells being formed in a row line along a first direction, the plurality of second electrode cells being formed in each column line along a second direction intersecting the first direction, the second electrode cells being alternately disposed with the first electrode cells.

According to at least one example embodiment, at least two first electrode cells are electrically connected to each other, and at least two second electrode cells are electrically connected to each other.

According to at least one example embodiment, the display device further comprises a sensor configured to sense an electric field around the at least one electrode. The switching unit is configured to electrically connect the at least one electrode to one of the display panel and the power storage unit based on output of the sensor.

According to at least one example embodiment, the switching unit is configured to (i) electrically connect the at least one electrode to the power storage unit if the sensor output indicates an electric field intensity is greater than or equal to a first electric field reference value, and (ii) electrically disconnect the at least one electrode to the power storage unit if the sensor output indicates the electric field intensity is less than a second electric field reference value.

According to at least one example embodiment, the first electric field reference value is equal to the second electric field reference value.

According to at least one example embodiment, the first electric field reference value is greater than the second electric field reference value.

According to at least one example embodiment, the switching unit connects the at least one electrode to the panel driving unit a desired time period after the output of the sensor indicates that the electric field intensity is less than the electric field reference value.

According to at least one example embodiment, the sensor output indicates an electric field gradient, and the switching unit is configured to electrically connect the at least one electrode to the power storage unit based on the electric field gradient.

According to at least one example embodiment, the switching unit connects the at least one electrode to the panel driving unit based on a voltage threshold associated with the power storage unit.

According to at least one example embodiment, the display panel includes a first substrate including a source line, a gate line, and a pixel electrode, the source line and the gate line being connected to the panel driving unit. The display panel includes a second substrate including the at least one electrode, a display material between the first substrate and the second substrate.

According to at least one example embodiment, a charging system includes the above described display device, and a charging device configured to generate electric field.

According to at least one example embodiment, the charging device includes a charging electrode configured to generate the electric field.

According to at least one example embodiment, the charging electrode is a thin film type electrode.

According to at least one example embodiment, a surface area of the charging electrode is greater than a surface area of the at least one electrode.

According to at least one example embodiment, the charging device further includes a first compensation circuit configured to compensate for a resistance of a capacitive structure formed by the at least one electrode and the charging electrode.

According to at least one example embodiment, the first compensation circuit includes an inductor.

According to at least one example embodiment, the display device further includes a second compensation circuit configured for impedance matching of the charging device and the display device.

According to at least one example embodiment, the second compensation circuit includes at least one of an inductor and a capacitor.

According to at least one example embodiment, A display device includes a display panel including at least one electrode, and a panel driving unit configured to display an image on the display panel based on a voltage applied to the at least one electrode. The display device includes a power storage unit, the at least one electrode being configured to supply a voltage to the power storage unit. The display device includes a control architecture configured to control an electrical connection of the at least one electrode based on an electric field around the at least one electrode.

According to at least one example embodiment, the control architecture includes a sensor, a user interface, a switching unit, and a control unit. The sensor is configured to sense the electric field around the at least one electrode. The user interface is configured to receive a user command. The switching unit is configured to electrically connect the at least one electrode to one of the panel driving unit and the power storage unit. The control unit is configured to control the switching unit based on at least one of the sensed electric field and the user command.

According to at least one example embodiment, the at least one electrode has a surface area that is at least a substantially same size as a surface area of a display region of the display panel.

According to at least one example embodiment, wherein the display panel is a touch screen, and the at least one electrode is a plurality of touch electrodes formed in a diagonal grid pattern on a substrate, the plurality of touch electrodes being configured to sense a touch on the touch screen.

According to at least one example embodiment, the panel driving unit is configured to sense a voltage change of the touch electrodes to detect a position of the touch.

According to at least one example embodiment, the touch electrode includes a plurality of first electrode cells and a plurality of second electrode cells, the plurality of first electrode cells being formed in a row line along a first direction, the plurality of second electrode cells being formed in each column line along a second direction intersecting the first direction, the second electrode cells being alternately disposed with the first electrode cells.

According to at least one example embodiment, at least two first electrode cells are electrically connected to each other, and at least two second electrode cells are electrically connected to each other.

According to at least one example embodiment, the at least one electrode is an outermost electrode with respect to other electrodes of the display panel.

According to at least one example embodiment, the at least one electrode includes a first electrode and a second electrode spaced apart from the first electrode.

According to at least one example embodiment, the display panel includes a first substrate including a source line, a gate line, and a pixel electrode, the source line and the gate line being connected to the panel driving unit. The display panel includes a second substrate including the at least one electrode, and a display material between the first substrate and the second substrate.

According to at least one example embodiment, the control architecture is configured to detect a voltage level of the power storage unit, and control the electrical connection of the at least one electrode based on the detected voltage level.

According to at least one example embodiment, the control architecture is configured to electrically connect the at least one electrode to the power storage unit if (i) the electric field is greater than or equal to a first electric field reference value, and (ii) the detected voltage level is less than a threshold value. The control architecture is configured to electrically connect the at least one electrode to the panel driving unit if (i) the electric field is less than a second electric field reference value less than the first electric field reference value, or (ii) the detected voltage level is greater than or equal to the threshold value.

According to at least one example embodiment, a charging system includes the above display device, and a charging device, the charging device being configured to generate the electric field.

According to at least one example embodiment, the charging device includes at least one charging electrode, the at least one charging electrode being configured to generate the electric field.

According to at least one example embodiment, a method of operating a display device includes detecting an electric field around at least one electrode of a display panel, the display panel being configured to display an image based on a voltage applied to the at least one electrode. The method includes switching an electrical connection of the at least one electrode to a power storage unit based on the detected electric field. The method further includes storing power in the storage unit if the at least one electrode is electrically connected to the power storage unit.

According to at least one example embodiment, the switching electrically connects the at least one electrode to the power storage unit if the detected electric field is greater than or equal to a first electric field reference value. The switching electrically disconnects the at least one electrode from the power storage unit if the detected electric field is less than a second electric field reference value.

According to at least one example embodiment, the first electric field reference value is equal to the second electric field reference value.

According to at least one example embodiment, the first electric field reference value is greater than the second electric field reference value.

According to at least one example embodiment, the method further includes detecting a voltage level of the power storage unit. The switching is further based on the detected voltage level.

According to at least one example embodiment, the switching electrically connects the at least one electrode to the power storage unit if (i) the detected electric field is greater than or equal to a first electric field reference value, and (ii) the detected voltage level is less than a voltage threshold value.

According to at least one example embodiment, the switching electrically disconnects the at least one electrode from the power storage unit if at least one of (i) the detected voltage level is greater than or equal to the voltage threshold value, and (ii) the detected electric field is less than a second electric field reference value.

According to at least one example embodiment, the first electric field reference value is equal to the second electric field reference value.

According to at least one example embodiment, the first electric field reference value is greater than the second electric field reference value.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION OF EXAMPLE EMBODIMENTS

Figure 1:
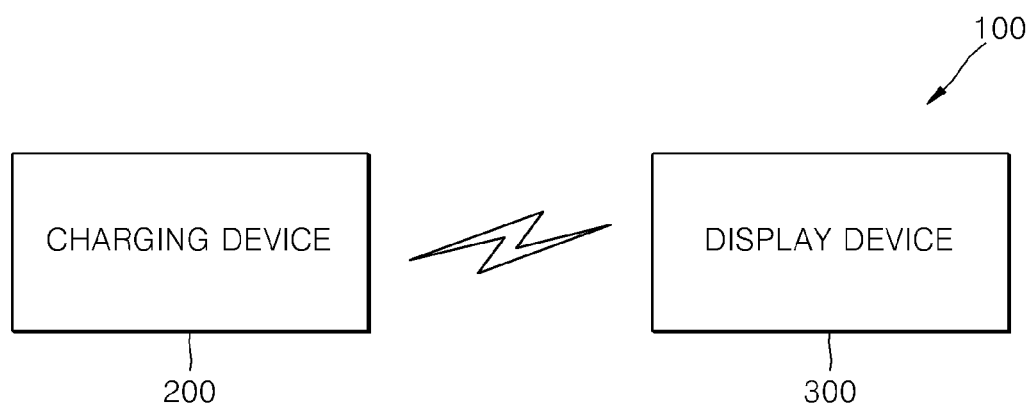
FIG. 1 is a block diagram illustrating a wireless charging system according to at least one example embodiment.

Example embodiments will be understood more readily by reference to the following detailed description and the accompanying drawings. The example embodiments may, however, be embodied in many different forms and should not be construed as being limited to those set forth herein. Rather, these example embodiments are provided so that this disclosure will be thorough and complete. In at least some example embodiments, well-known device structures and well-known technologies will not be specifically described in order to avoid ambiguous interpretation.

It will be understood that when an element is referred to as being "connected to" or "coupled to" another element, it can be directly on, connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the example embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

FIG. 1 is a block diagram illustrating a wireless charging system according to at least one example embodiment.

Referring to FIG. 1, the wireless charging system 100 includes a charging device 200 and a display device 300 receiving power from the charging device 200 to charge a mounted power storage device (for example, a battery) of the display device 300. For example, by moving a charging electrode of the charging device 200 within a desired distance of an electrode of the display device 300, the electric field generated between the electrodes may be used to charge the display device 300. In order for charging to be performed by such an electric field coupling method (also referred to as a capacitive coupling method), an electrode in the display panel of the display device may be used as an electrode for charging. The display device 300 according to at least one example embodiment may include devices driven using the power of a battery such as smart phones, notebook computers, digital broadcasting terminals, personal digital assistants (PDAs), portable multimedia players (PMPs), navigation systems, etc.

Figure 2:
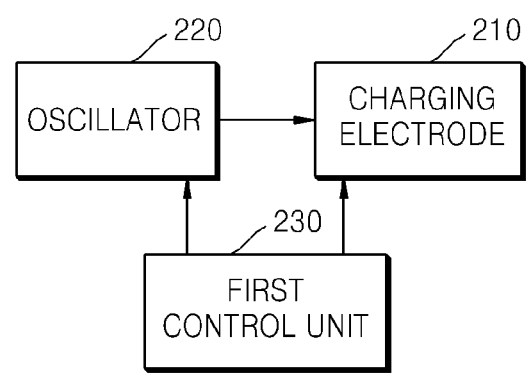
FIG. 2 is a block diagram illustrating a charging device of FIG. 1 according to at least one example embodiment.

FIG. 2 is a block diagram illustrating the charging device 200 of FIG. 1 according to at least one example embodiment. Referring to FIG. 2, the charging device 200 may include a charging electrode 210, an oscillator 220, and a first control unit 230.

The charging electrode 210 may be relatively thin and have a relatively large section that is a thin film type. The charging electrode 210 may be larger than an electrode in the display panel of the display device 300. For example, a surface area of the charging electrode 210 of the charging device 200 may be larger than a surface area of an electrode in the display panel of the display device 300. Accordingly, a charging portion of the charging device 200 may be expanded. The charging electrode 210 may be disposed at the perimeter of the charging device 200 to be coupled with the display panel of the display device 300, and an insulating film may be applied on the charging electrode 210. The charging electrode 210 may include a metal such as Ti, Pt, Ru, Au, Ag, Mo, Al, W, and/or Cu, a metal oxide such as indium tin oxide (ITO), Aluminum Zinc Oxide (AZO), Indium Zinc Oxide (IZO), Tin oxide ($SnO_2$), and/or $In_2O_3$, and/or a carbon structure such as a graphene and carbon nanotube. At least one charging electrode 210 may be included in the charging device 200. When the charging electrode 210 is a plurality of charging electrodes, the plurality of charging electrodes 210 are spaced part from each other side-by-side to be connected in parallel to the display device 300.

The oscillator 220 receives a voltage from a battery in an external adapter or from the charging device 200 to generate AC voltage and applies the AC voltage to the charging electrode 210.

The first control unit 230 controls an overall operation of the charging device 200. For example, the first control unit 230 performs processing and controlling of battery charging of the display device 300 connected to the charging device 200, and performs a series of processing steps to charge the display device 300 wirelessly. The first control unit 230 may include appropriate hardware and/or software to control an overall operation of the charging device 200. For example, the first control unit 230 may include one or more Central Processing Units (CPUs), digital signal processors (DSPs), application-specific-integrated-circuits, field programmable gate arrays (FPGAs) or the like.

It should be understood that the charging device 200 may be included as part of any consumer product used in connection with mobile display devices. For example, the charging device 200 may be included as part of a cover for a tablet computer, a holster for a cellular phone, a stationary pad on a work desk, a charging station at an airport, a center console in an automobile, etc.

Figure 3:
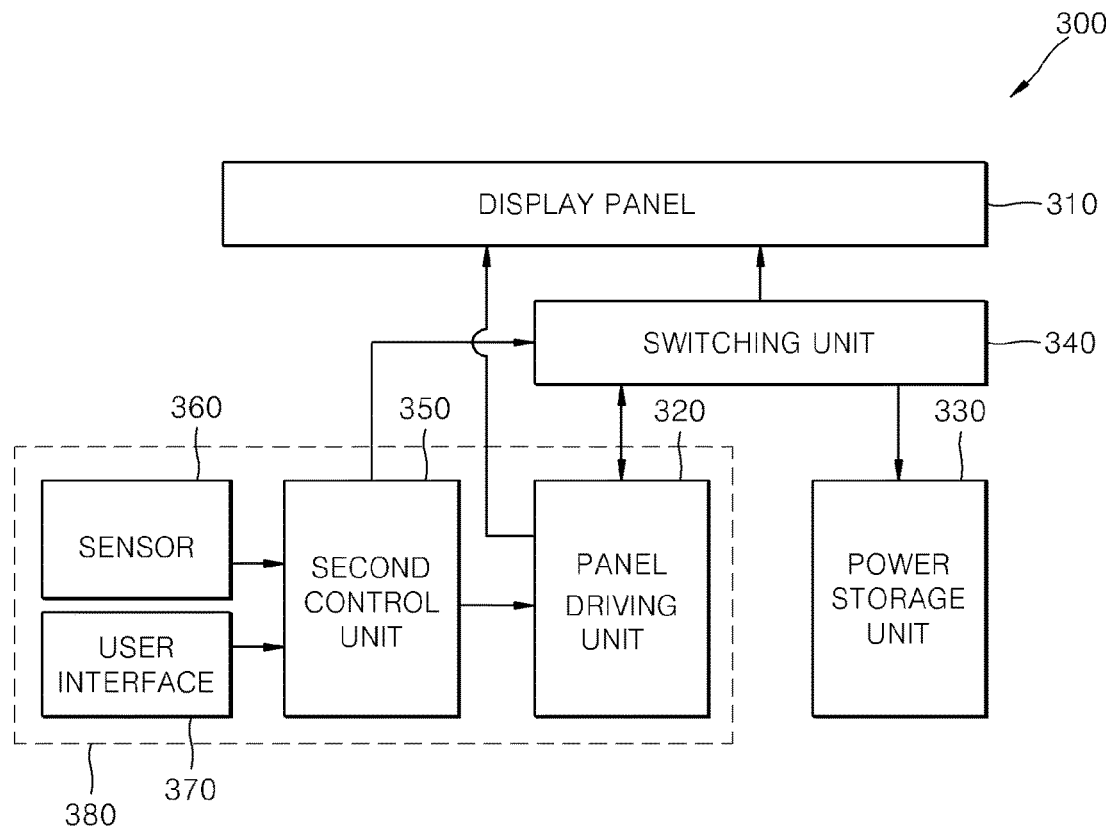
FIG. 3 is a block diagram illustrating a display device of FIG. 1.

FIG. 3 is a block diagram illustrating the display device 300 of FIG. 1. Referring to FIG. 3, the display device 300 may include a display panel 310, a panel driving unit 320, a power storage unit 330, a switching unit 340, a second control unit 350, a sensor 360, and a user interface 370.

The sensor 360, panel driving unit 320, the switching unit 340, the second control unit 350, the sensor 360, and the user interface 370 may be referred to as a control architecture.

The display panel 310 of the display device 300 displays various information (e.g., images) regarding an operation of the display device 300. The display panel 310 may be a general display panel or a touch screen panel having a touch function.

The panel driving unit 320 drives the display panel 310 in order to display an image, i.e., an original function of the display panel 310. The panel driving unit 320 may apply voltage to the electrodes in the display panel 310 in order to drive the display panel 310. For example, the panel driving unit 320 may include a voltage generating unit (not shown) to apply voltage to a common electrode or a touch electrode of the display panel 310.

The power storage unit 330 receives power from an external device (e.g., the charging device 200), stores the received power, generates a voltage necessary for driving a load 380 of the display device 300, and applies the generated voltage to the load 380.

The switching unit 340 selectively connects the display panel 310 to the panel driving unit 320 or the power storage unit 330 under a control of the second control unit 350. It should be understood that the switching unit 340 may include any number of appropriate hardware elements, e.g., transistors, in order to achieve selective connection within the display device 300.

The second control unit 350 controls an overall operation of the display device 300. For example, the second control unit 350 may control the switching unit 340 to connect the display panel 310 to the panel driving unit 320 or the power storage unit 330, on the basis of one or more control signals (e.g., a control signal based on a sensing result from the sensor 360). The second control unit 350 may include appropriate hardware and/or software to control an overall operation of the of the display device 300. For example, the second control unit 350 may include one or more Central Processing Units (CPUs), digital signal processors (DSPs), application-specific-integrated-circuits, field programmable gate arrays (FPGAs) or the like.

The sensor 360 may be an electric field sensor capable of sensing an electric field at the upper side of the display panel 310. For example, the sensor 360 may be a Hall effect sensor.

When the display panel 310 is closer to the charging electrode 210 of the charging device 200 (for example, when the display panel 310 is facing the charging electrode 210), an electric field occurs between the charging electrode 210 and the outermost electrode of the display panel 310. If the sensor 360 detects that an electric field gradient or intensity exceeds a reference value (or electric field reference value), the sensor 360 applies the detection result to the second control unit 350. In this case, the second control unit 350 may control the switching unit 340 to connect the display panel 310 to the power storage unit 330. The reference value may be a design parameter set based on empirical study for each particular application or implementation.

Or, when the display panel 310 and the charging electrode 210 are separated by more than a desired (or alternatively, predetermined distance), an electric field gradient or intensity between the charging electrode 210 and the outermost electrode of the display panel 310 may be less than the reference value (or electric field reference value). If the sensor 360 detects that an electric field gradient or intensity is less than the reference value, the sensor 360 applies the detection result to the second control unit 350. In this case, the second control unit 350 may control the switching unit 340 connect the display panel 310 to the panel driving unit 320. The reference value (or electric field reference value) may be a design parameter set based on empirical study for each particular application or implementation.

Additionally or alternatively to controlling the switching unit 340 based on a detection result from the sensor 360, the second control unit 350 may receive a user command from the user interface 370 to control the switching unit 340. For example, when a display mode for activating a display function of the display panel 310 is set through the user interface 370, the second control unit 350 may control the switching unit 340 to connect the display panel 310 to the panel driving unit 320. Further, when a charging mode is set through the user interface 370, the second control unit 350 may control the switching unit 340 to connect the display panel 310 to the power storage unit 330.

Further, if the display panel 310 is close to the charging device 200 so as to activate the charging mode, and if a voltage value of the battery 430 exceeds a reference voltage value (or a threshold voltage value), the second control unit 350 may control the switching unit 340 to connect the display panel 310 to the panel driving unit 320. The reference voltage value (or threshold voltage value) may be a design parameter set based on empirical study for each particular application or implementation. For example, the reference voltage value (or threshold voltage value) may indicate that the battery 430 is fully charged.

Figure 4:
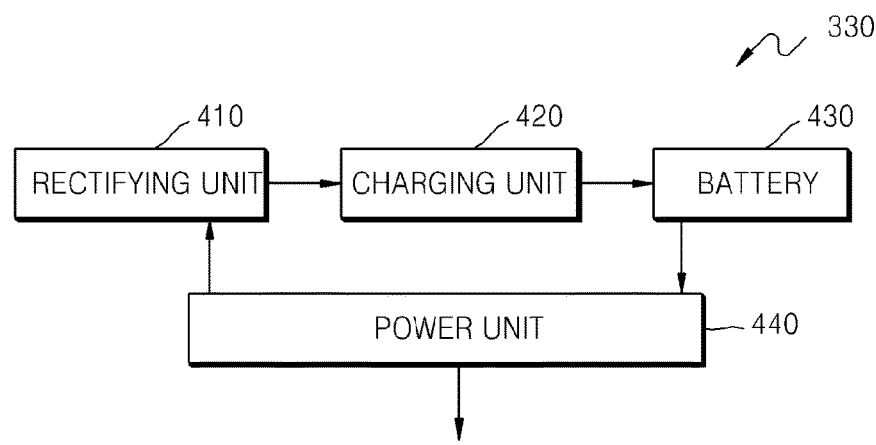
FIG. 4 is a block diagram illustrating a power storage unit of FIG. 3.

FIG. 4 is a block diagram illustrating the power storage unit 330 of FIG. 3. The power storage unit 330 may include a rectifying unit 410, a charging unit 420, a battery 430, and a power unit 440.

The rectifying unit 410 may generate DC voltage from AC voltage received from the charging device 200 in order to provide power to charge the battery 430. Then, the charging unit 420 may charge the battery 430 through the DC voltage generated from the rectifying unit 410, and may apply the DC voltage to the power unit 440.

The power unit 440 may generate a voltage necessary for driving the load 380 of the display device 300 by using the DC voltage stored in the battery 430 and/or the voltage provided by the charging unit 420. The power unit 440 may apply the generated voltage to the load 380.

The battery 430 used in the display device 300 may be a battery that is repeatedly charged and discharged. The battery 430 is charged when the DC voltage generated from the rectifying unit 410 is supplied, and is discharged when the power stored in the battery 430 is supplied to the load 380 through the power unit 440.

It should be understood that many layers may be stacked in the display panel 310 in order to perform a display function (e.g., display an image). For example, when the display panel 310 is connected to the panel driving unit 320, the layers in the display panel 310 may display an image according to an applied voltage. On the other hand, when the display panel 310 is connected to the power storage unit 330, the electrode of the display panel 310 may be used as an electrode for charging the battery 430. The outermost electrodes among the electrodes of the display panel 310 may be used as electrodes for charging the battery 430.

Figure 5A:
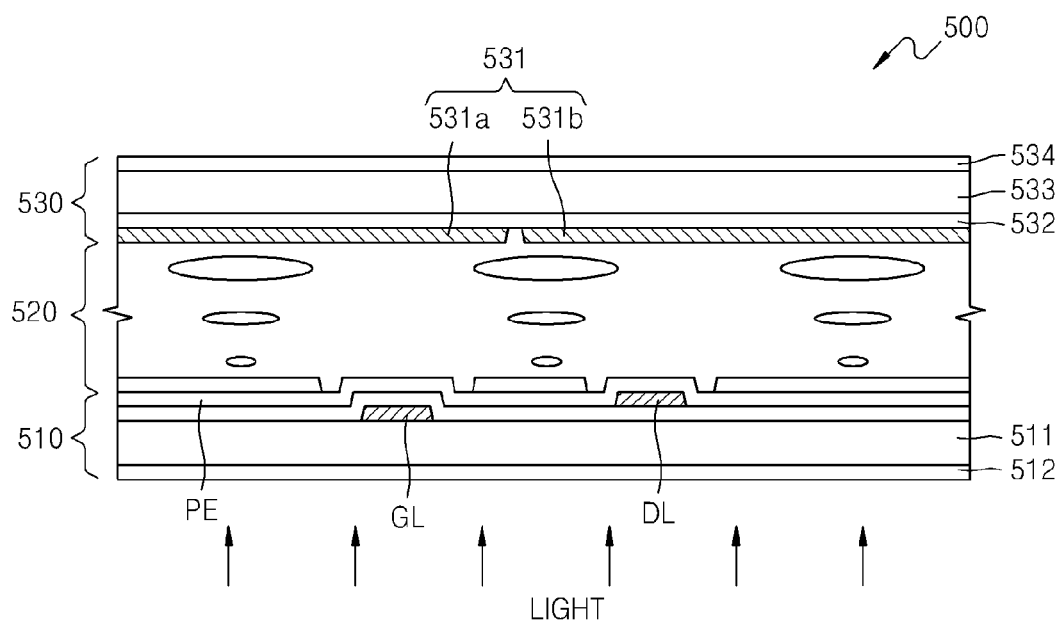
FIG. 5A is a cross-sectional view of a display panel according to at least one example embodiment.
Figure 5B:
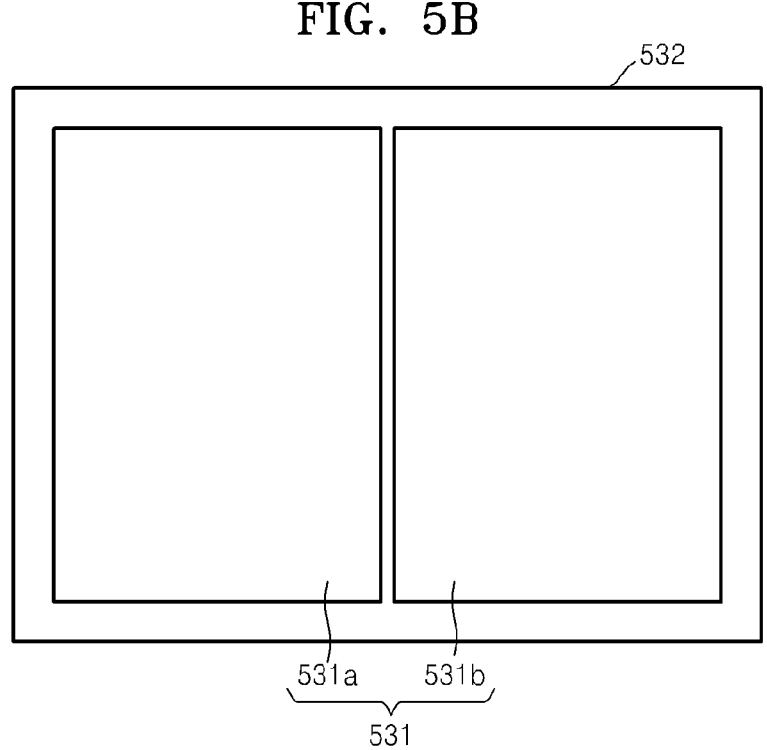
FIG. 5B is a plan view of a common electrode in the display panel of FIG. 5A.
Figure 5C:
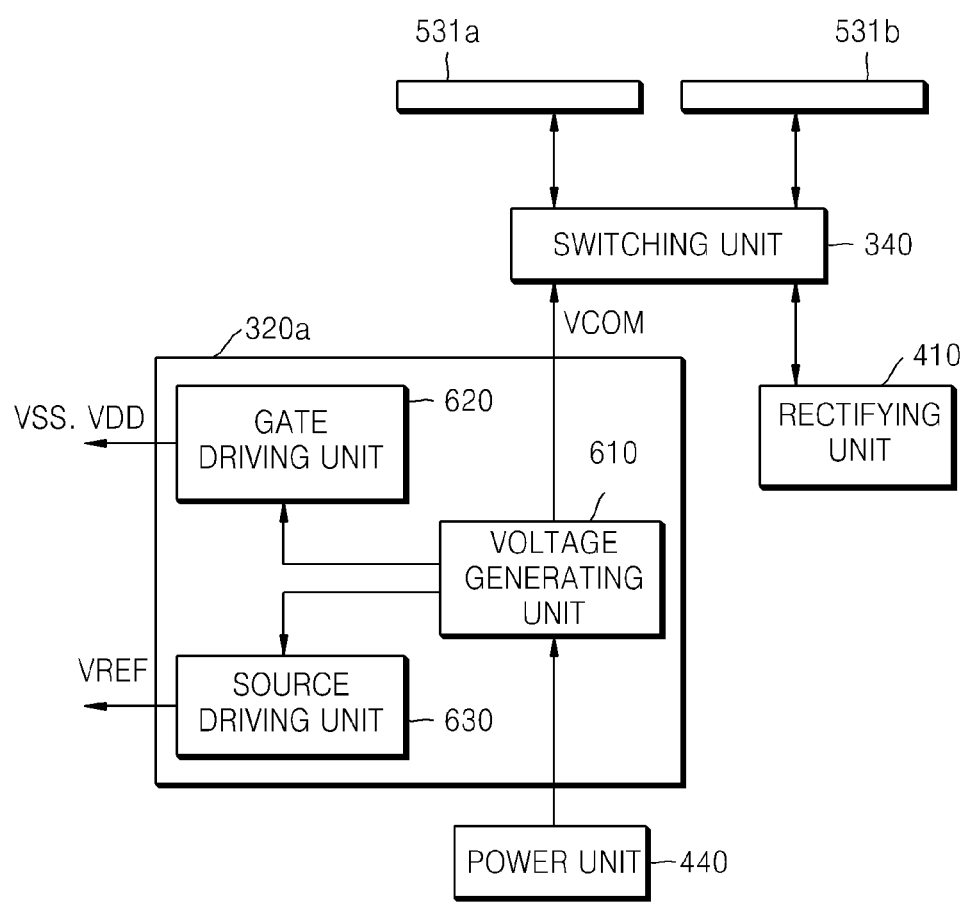
FIG. 5C is a block diagram relating to displaying or charging through an electrode of the display panel 5A.
Figure 5D:
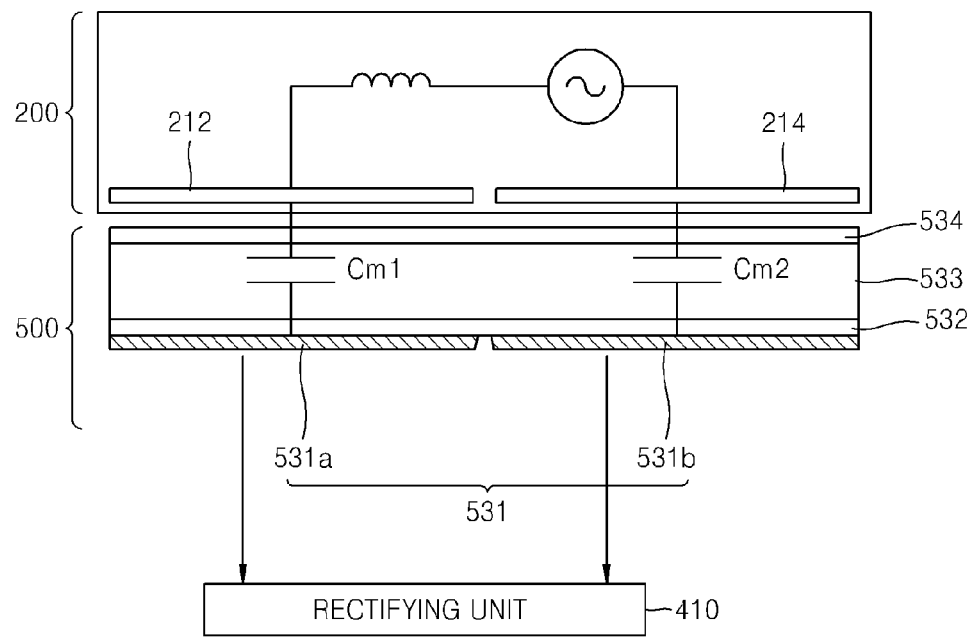
FIG. 5D is a view when the display panel of FIG. 5A is coupled to a charging device.

FIG. 5A is a cross-sectional view of a display panel according to at least one example embodiment. FIG. 5B is a plan view of a common electrode in the display panel of FIG. 5A. FIG. 5C is a block diagram relating to displaying or charging through an electrode of the display panel 5A. FIG. 5D is a view when the display panel of FIG. 5A is coupled to a charging device.

As shown in FIG. 5A, the display panel 500 may include an array substrate 510, a liquid crystal layer 520, and an opposing substrate 530. The array substrate 510 may include a first substrate 511 having a source line DL, a gate line GL, and a pixel electrode PE formed thereon, and a first optical film 512 disposed below the first substrate 511. Also, the opposing substrate 530 may include a second substrate 533 having a common electrode 531 and a color filter 532 formed thereon, and a second optical film 534.

The common electrode 531 may be formed of one layer over the entire second substrate 533, may be formed of one electrode for each pixel electrode PE obtained by grouping a plurality of pixel electrodes PE, or may be formed as one electrode for each pixel electrode PE. In addition, as shown in FIG. 5B, the common electrode 531 may be formed as two common electrodes 531a and 531b. When there are two common electrodes 531a and 531b, charging efficiency may be relatively high.

Also, a panel driving unit 320a, as shown in FIG. 5C, includes a voltage generating unit 610, a gate driving unit 620, and a source driving unit 630.

The voltage generating unit 610 receives power from the power unit 440, and then generates driving voltages. The driving voltages include gate on and off voltages (VSS and VDD, respectively) provided to the gate driving unit 620, reference voltages VREF provided to the source driving unit 630, and common voltages provided to the common electrode 531.

When the switching unit 340 connects the common electrode 531 to the voltage generating unit 610 of the panel driving unit 320a, the gate driving unit 620 may output the gate on voltage VSS or the gate off voltage VDD to the gate line GL in response to a gate control signal provided from the second control unit 350. The gate control signals may include a vertical start signal STV. The source driving unit 630 may output a data signal to the source lines DL on the basis of the reference voltage VREF. Then, the voltage generating unit 610 outputs a common voltage to the common electrode 531.

By applying each data signal and common voltage between the pixel electrode PE and the common electrode 531 of the pixels selected by the gate signal, a desired (or alternatively, predetermined) electric field is formed. Then, since light transmittance is adjusted according to an arrangement angle of a liquid crystal changed by the electric field, an image is displayed. At this point, the common electrode 531 may serve as an electrode for display.

Moreover, when the switching unit 340 connects the common electrode 531 to the rectifying unit 410, since a color filter 532, a second substrate 533, and a second optical film 534 are disposed on the upper side of the display panel 500 with respect to the common electrode 531, the common electrode 531 and the charging electrode 210 of the charging device 200 may form a capacitive structure.

For example, as shown in FIG. 5D, when the display panel 500 is disposed on the first and second charging electrodes 212 and 214 of the charging device 200, the first and second charging electrodes 212 and 214 are connected in parallel to the first and second common electrodes 531a and 531b of the display panel 500, thereby forming two capacitive structures. Power is supplied from the charging device 200 to the display device 300 through the two capacitive structures according to an electric field coupling method. Thus, the common electrode 531 may serve as an electrode for charging the display device 300.

Figure 6A:
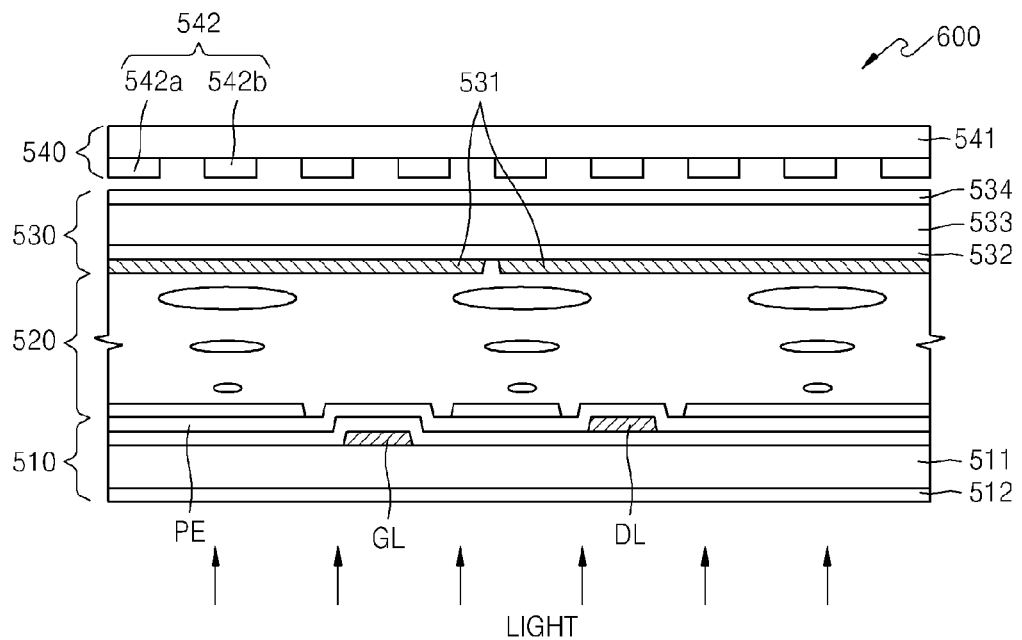
FIG. 6A is a cross-sectional view of a touch screen panel according to at least one example embodiment.
Figure 6B:
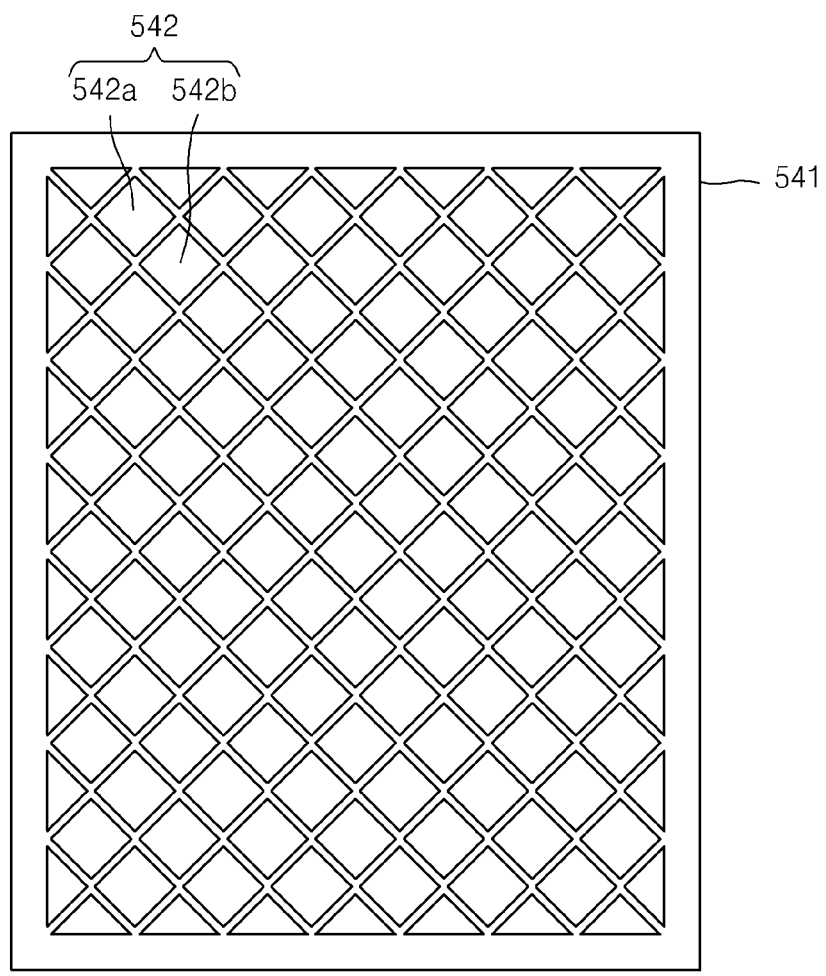
FIG. 6B is a plan view illustrating a touch electrode of the touch screen panel of FIG. 6A.
Figure 6C:
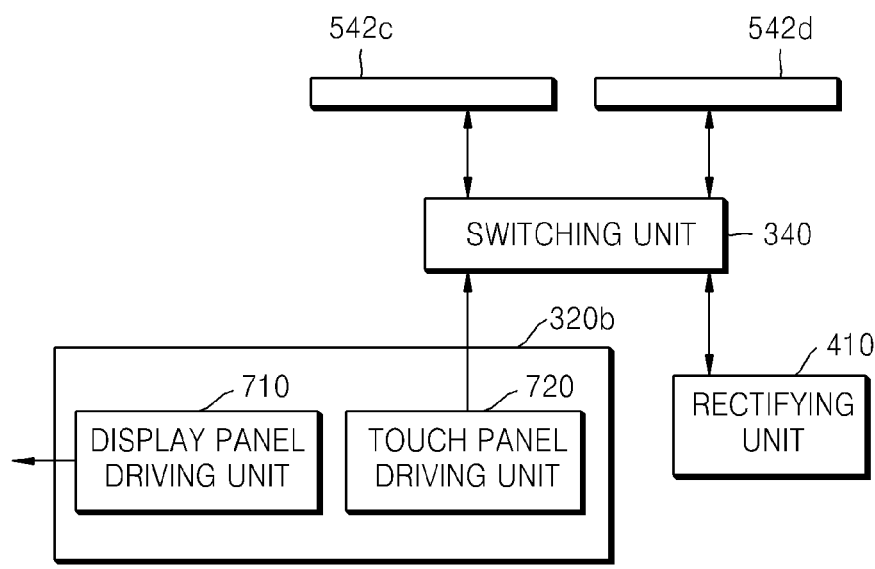
FIG. 6C is a block diagram relating to the driving or charging of the touch screen panel of FIG. 6A.
Figure 6D:
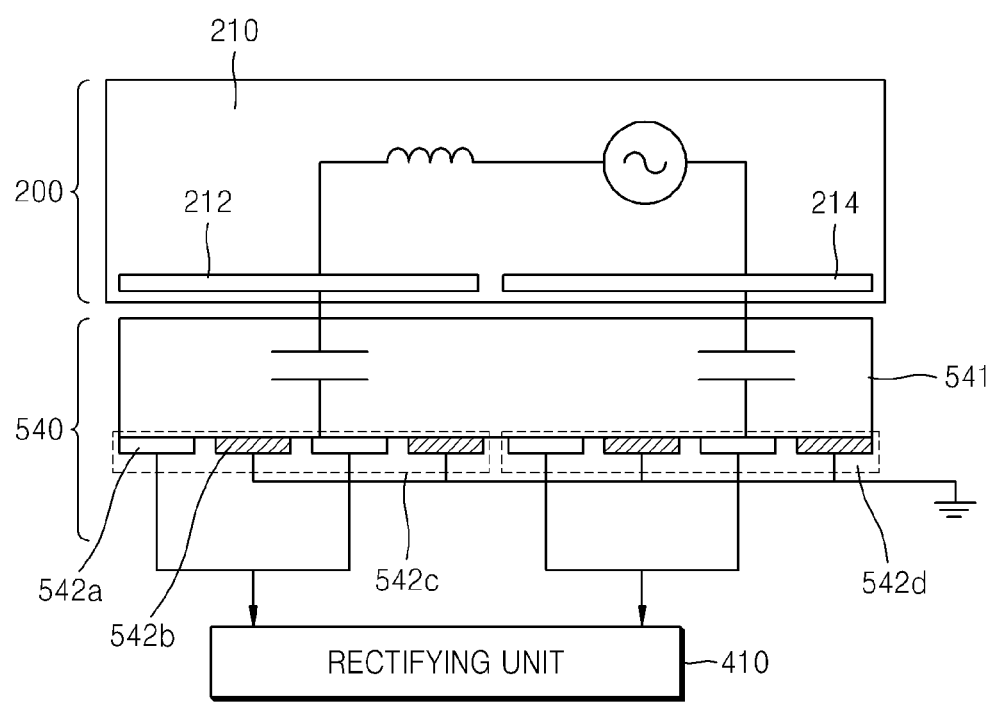
FIG. 6D is a view when the display panel of FIG. 6A is coupled to a charging device.

FIG. 6A is a cross-sectional view of a touch screen panel according to at least one example embodiment. FIG. 6B is a plan view illustrating a touch electrode of the touch screen panel of FIG. 6A. FIG. 6C is a block diagram relating to the driving or charging of the touch screen panel of FIG. 6A. FIG. 6D is a view when the display panel of FIG. 6A is coupled to a charging device.

As shown in FIGS. 6A and 6B, the touch screen panel 600 may further include the touch panel 540 on the display panel 500. The touch panel 540 includes a third substrate 541 and a touch electrode 542.

The touch electrode 542 may include a plurality of first electrode cells 542a and a plurality of second electrode cells 54b. The plurality of first electrode cells 54b may be formed for each row line along a first direction, for example, a row direction, and the plurality of second electrode cells 542b may be formed for each column line along a second direction intersecting the first direction, for example, a column direction. The plurality of second electrode cells 542b may be alternately disposed and do not overlap the first electrode cells 542a. At least two first electrode cells 542a may be grouped and then electrically connected to each other, and also at least two second electrode cells 542b may be grouped and then electrically connected to each other. However, the first electrode cells 542a and the second electrode cells 542b are not mutually connected to each other.

Electrode cells 542a and 542b may be formed of a transparent conductive material such as an indium-tin-oxide (ITO) in order to transmit light from a display panel (not shown) below the touch panel 540.

The panel driving unit 320b, as shown in FIG. 6C, includes a display panel driving unit 710 for driving the display panel 500 and a touch panel driving unit 720 for driving the touch panel 540. The switching unit 340 selectively connects the touch electrode 542 to the touch panel driving unit 720 of the panel driving unit 320b or the rectifying unit 410 of the power storage unit 330. Since the outermost electrode of the touch screen panel is the touch electrode 542, the touch electrode 542 may serve as an electrode for charging the display device 300. In this case, the common electrode 531 in the touch screen panel may only serve as an electrode for display. In other words, in relation to the touch screen panel, the common electrode 531 is connected to a voltage generating unit (not shown) of the display panel driving unit 710, but is not connected to the switching unit 340.

When the switching unit 340 connects the touch electrode 542 to the touch panel driving unit 720, the touch panel driving unit 720 drives the touch panel 540. For example, the touch panel driving unit 720 detects a touch position on the touch panel 540 and sends touch information to the display panel driving unit 710. The display panel driving unit 710 drives the display panel 500 by reflecting the touch information onto the display panel 500. The touch position may be detected on the basis of a voltage change of the first and second electrode cells 542a and 542b.

According to at least one example embodiment, the switching unit 340 may connect the touch electrode 542 to the rectifying unit 410. Since the touch electrode 542 includes the first and second electrode cells 542a and 542b, the switching unit 340 may connect one of the first and second electrode cells 542a and 542b to the rectifying unit 410. For example, the switching unit 340 may connect the first electrode cell 542a to the rectifying unit 410. Also, the first electrode cells 542a are grouped into first and second sub electrodes 524c, 542d. The first and second sub electrodes 524c, 542d are spaced apart from each other and are not electrically connected to each other. Electrode cells in each of the first and second sub electrodes 524c, 542d may be electrically connected to each other. Since the third substrate 541 is disposed on the upper side of the touch panel 540 with respect to the touch electrode 542, the touch electrode 542 and the charging electrode 210 of the charging device 200 may form a capacitive structure.

For example, as shown in FIG. 6D, when the touch screen panel 600 is disposed on the charging electrode 210 of the charging device 200, the first and second charging electrodes 212 and 214 are connected in parallel to the first and second sub electrodes 542c and 542d of the touch panel 540, thereby forming two capacitive structures. Power may be supplied from the charging device 200 to the display device 300 through the two capacitive structures according to an electric field coupling method. Thus, the touch electrode 541 may serve as an electrode for charging the display device 300.

Figure 7:
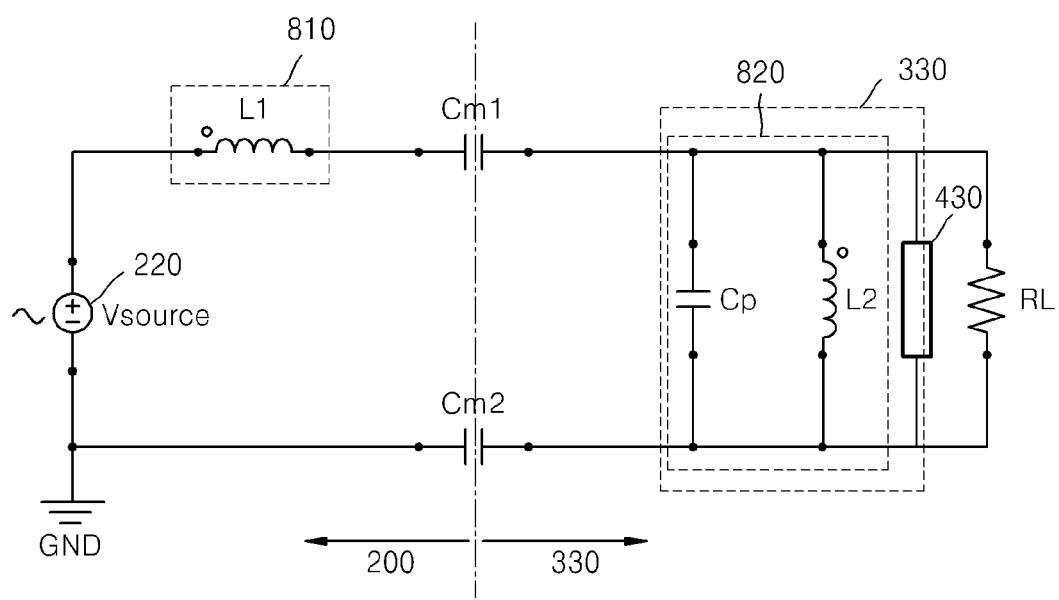
FIG. 7 is an equivalent circuit of a charging device and a display device when the display device is charged wirelessly according to at least one example embodiment.

FIG. 7 is an equivalent circuit of the charging device 200 and power storage unit 330 of the display device when the display device 300 is charged wirelessly according to at least one example embodiment.

The left side of the equivalent circuit corresponds to the charging device 200, and the right side of the equivalent circuit corresponds to power storage unit 330. In addition, when the charging device 200 supplies power to the power storage unit 330, a resistance occurs in capacitive structures Cm1 and Cm2 during a power delivery process. Therefore, the charging device 200 may include a first compensation circuit 810 for compensating for the resistance. The first compensation circuit 810 may include an inductor L1 and may be connected in series to the oscillator 220.

Additionally, in order for the impedance of the charging device 200 and the power storage unit 330 to be matched, the power storage unit 330 may additionally include a second compensation circuit 820. The second compensation circuit 820 may include an inductor L2 and a capacitor Cp. The second compensation circuit 820 may be connected in parallel to a load resistor RL of the power storage unit 330. The inductance of the inductor L2 and the capacitance of the capacitor Cp may be variable. Further, the second compensation circuit 820 may include only one of the inductor L2 and the capacitor Cp. Therefore, the power storage unit 330 may be charged wirelessly from the charging device 200 regardless of the impedance of the charging device 200.

The above-mentioned display panels 500 and 600 are just examples for convenience of description. The principles described above may be applied to a display panel having a different structure than the above-mentioned display panels 500 and 600 so long as the outermost electrodes of the display panel are used as electrodes for charging.

In at least one example embodiment, a liquid crystal display panel is exemplified as a display panel, but inventive concepts are not limited thereto. The display panel may be applied to a Plasma Panel Display (PDP), an Organic Light Emitting Diode (OLED), a Field Emission Display (FED), etc.

Figure 8:
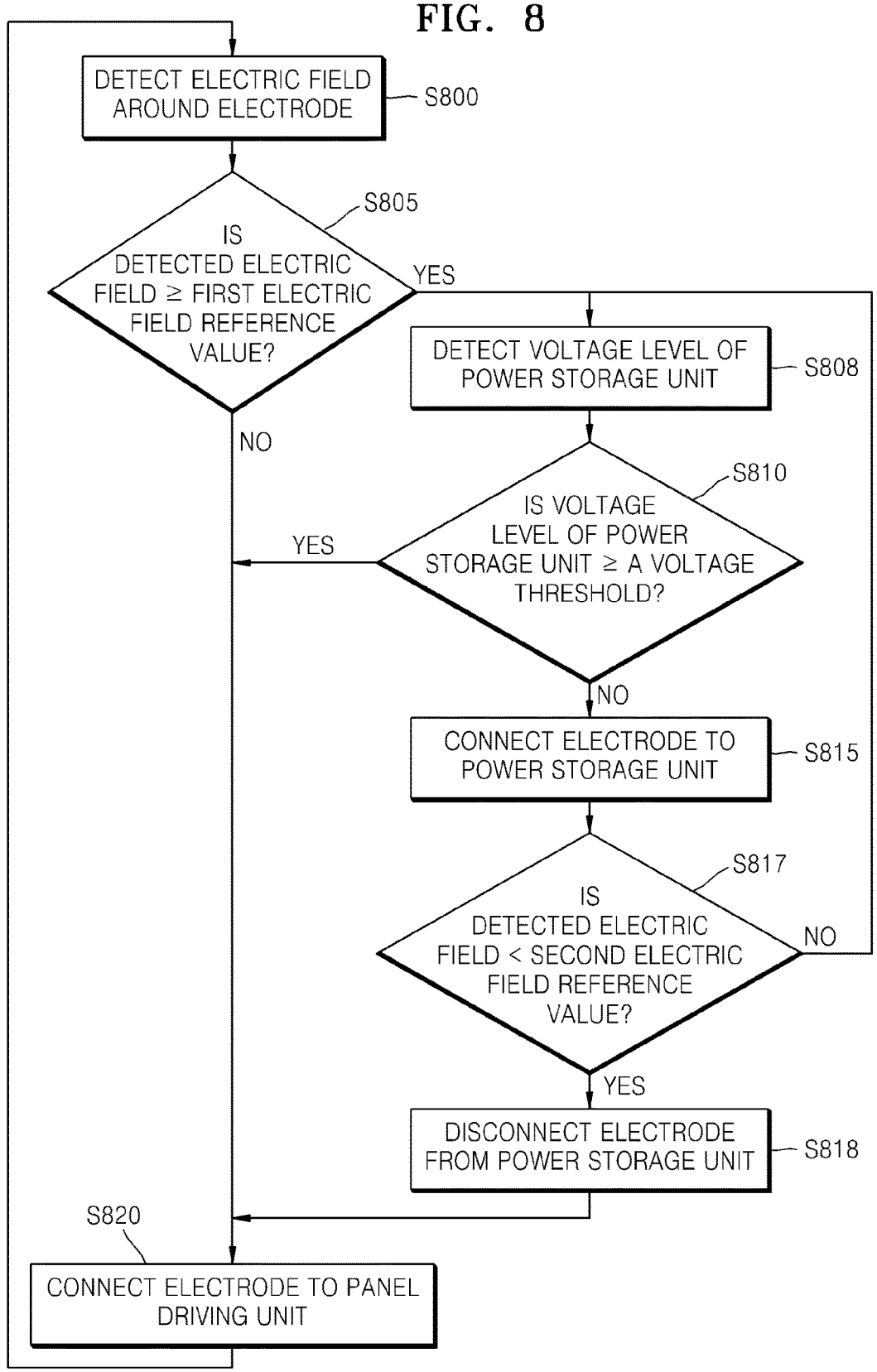
FIG. 8 shows a method of operating the display device of FIG. 1 according to at least one example embodiment.

FIG. 8 shows a method of operating the display device of FIG. 1 according to at least one example embodiment. FIG. 8 will be described with reference FIGS. 1-7.

In step S800, the sensor 360 may detect an electric field around at least one electrode of a display panel. For example, the sensor 360 may detect an intensity of electric field and/or an electric field gradient around the common electrode 531 or the touch electrode 542.

In step S805, the second control unit 350 may determine whether the detected electric field is greater than or equal to a first electric field reference value. If the second control unit 350 determines that the detected electric field is less than the first electric field reference value, then the method proceeds to step S820. In step S820, the second control unit 350 controls the switching unit 340 to connect the common electrode 531 or the touch electrode 542 to the panel driving unit 320. The first electric field reference value may be a design parameter set based on empirical study for each particular application or implementation.

If, in step S805, the second control unit 350 determines that the detected electric field is greater than or equal to the first electric field reference value, then the method proceeds to step S808.

In step S805, the first electric field reference value may be a value associated with the occurrence of electric field coupling between the common electrode 531 (or the touch electrode 542) and the charging electrode 210. For example, electric field coupling between the common electrode 531 (or the touch electrode 542) and the charging electrode 210 may be occurring if the detected electric field is greater than or equal to the first electric field reference value. However, electric field coupling is not occurring if the detected electric field is less than the first electric field reference value.

In step S808, the second control unit 350 detects a voltage level of the power storage unit 330 (e.g., a voltage level of the battery 430). In step S810, the second control unit 350 determines whether the voltage level of power storage unit 330 is greater than or equal to a voltage threshold value. If the second control unit 350 determines that the detected voltage level is greater than or equal to the voltage threshold value, then the method proceeds to step S820, and the second control unit 350 controls the switching to 340 to connect the common electrode 531 or the touch electrode 542 to the panel driving unit 320. The voltage threshold value may be a design parameter set based on empirical study for each particular application or implementation.

If, in step S810, the second control unit 350 determines that the detected voltage level is less than the voltage threshold value, then the method proceeds to step S815. In step S815, the second control unit 350 controls the switching unit 340 to connect the common electrode 531 or the touch electrode 542 to the power storage unit 330.

In step S810, the voltage threshold value may be associated with a charge level of the power storage unit 330 (e.g., the battery 430). The voltage threshold value may indicate whether the power storage unit 330 has reached a desired charge level. For example, if the second control unit 350 determines that a voltage of the power storage unit 330 is greater than or equal to the voltage threshold value, then the power storage unit 330 may be considered as fully charged. However, if the second control unit 350 determines that a voltage of the power storage unit 330 is less than the voltage threshold value, then the power storage unit 330 may be considered as not fully charged.

Based on the above description, it should be understood that step S815 may correspond to a charging mode of the display device 300, wherein the power storage unit 330 (e.g., the battery 430) of the display device 300 charges by electric field coupling between the common electrode 531 (or the touch electrode 542) and the charging electrode 210. It should also be understood that step S820 may correspond to a display mode of the display device 300, wherein the panel driving unit 320 drives the display panel 310 to, for example, display an image using the common electrode 531 (or the touch electrode 542).

It should be further understood that steps S808 and S810 are optional steps within the described method. For example, according to at least one example embodiment, the method may proceed directly from step S805 to step S815.

Steps S817 and S818 may be optionally carried out after step S815. In step S817, the second control unit 350 may determine whether the detected electric field is less than a second electric field reference value. If the detected electric field is less than the second electric field reference value, then the second control unit 350 may control the switching unit 340 to disconnect the common electrode 531 or the touch electrode 542 from the power storage unit 330. For example, the second control unit 350 may disconnect the common electrode 531 or touch electrode 542 from the power storage unit and then proceed to step S820, and connect the common electrode 531 or touch electrode 542 to the panel driving unit 320. If the detected electric field is greater than or equal to the second electric field reference value, then the method returns to step S808, wherein the voltage level of the power storage unit 330 is again detected.

The second electric field reference value may be a design parameter set based on empirical study for each particular application or implementation. The second electric field reference value may have a same value or a different value from the first electric field reference value mentioned in step S805. For example, the second electric field reference value may be less than the first electric field reference value. In this case, the second electric field reference value may be less than the first electric field reference value by a switching margin. The switching margin may be set so as to reduce (or alternatively, prevent) a so-called ping-pong effect occurring as a result of a varying electric field around the common electrode 531 of the touch electrode 542. In other words, the second electric field reference value is set to be less than the first electric field reference value such that performing steps S817 and S818 may reduce the occurrence of undesired switching of the switching unit 340 that would otherwise be caused by a varying electric field. It should be understood that the switching margin may be a design parameter set based on empirical study for each particular application or implementation.

FIGS. 9-13B illustrate implementations of the charging device of FIG. 1 according to at least one example embodiment. FIGS. 9-13B will be described with reference FIGS. 1-8.

Figure 9:
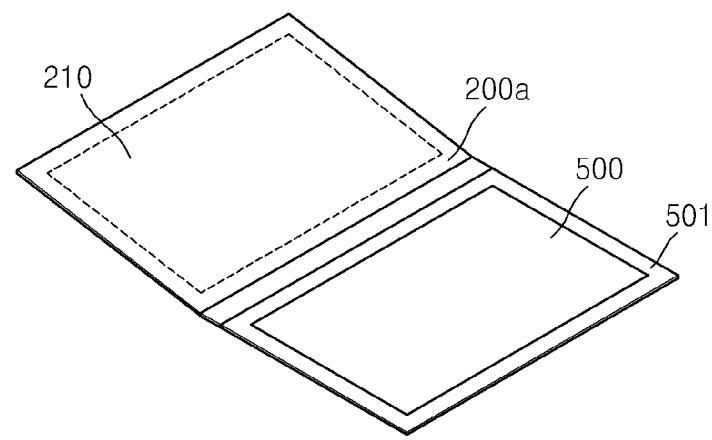
FIGS. 9-13B illustrate example implementations of the charging device of FIG. 1 according to at least one example embodiment.

FIG. 9 shows a charging device 200a according to at least one example embodiment. FIG. 9 shows that charging device 200a may be implemented as a cover for a tablet computer 501 having a display 500. As shown in FIG. 9, charging device 200a may have a charging electrode 210.

Figure 10A:
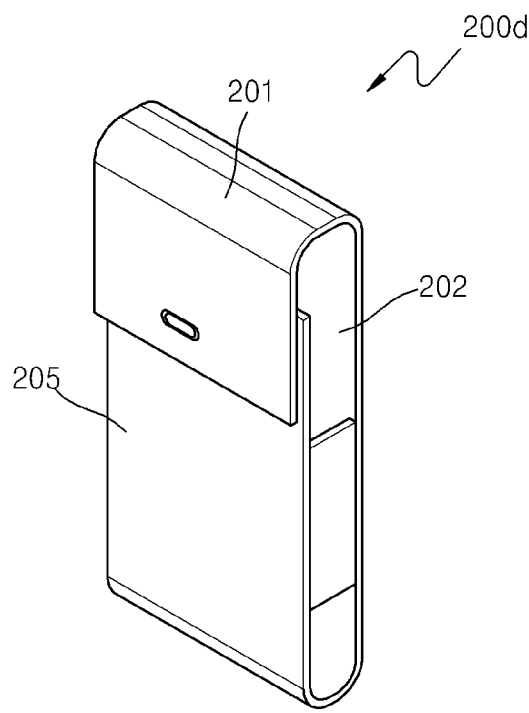
Figure 10B:
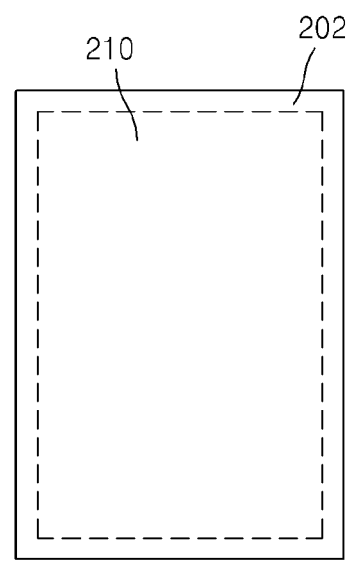

FIGS. 10A and 10B show a charging device 200b according to at least one example embodiment. For example, FIGS. 10A and 10B show that the charging device 200b may be implemented as a holster 201 for a cellular phone. The holster 201 may have a back surface 202 in which a charging electrode 210 is embedded. FIG. 10B shows the back surface 202 as having the charging electrode 210. It should be understood that charging electrode 210 is not limited to the location shown in FIGS. 10A and 10B. For example, the charging electrode 210 may be embedded in a front surface 205 of the holster 201.

Figure 11:
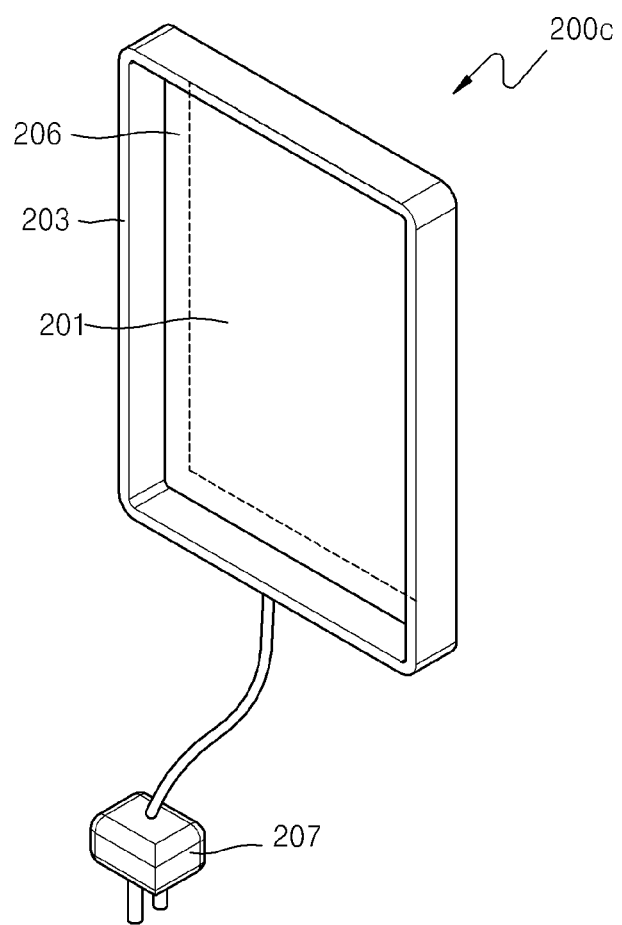

FIG. 11 shows a charging device 200c according to at least one example embodiment. FIG. 11 shows an implementation of the charging device 200c as a pad having a flat surface 206, an electrical power cord 207, and a raised edge 203. A charging electrode 210 may be embedded in the surface 206. The electrical power cord 207 may be suited for connection to a wall outlet and/or a power outlet in an automobile. Thus, the charging device 200c may be particularly useful at an office desk or in an automobile.

Figure 12:
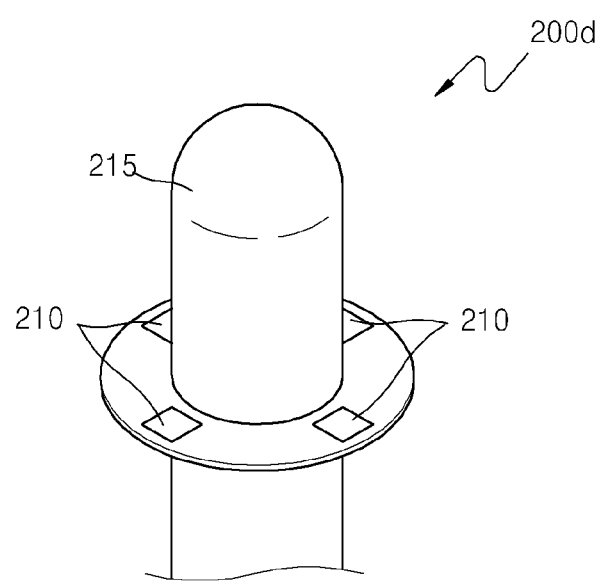

FIG. 12 shows a charging device 200d according to at least one example embodiment. FIG. 12 shows an implementation of the charging device 200d as a charging station at, for example, an airport. Charging device 200d may include a charging kiosk 215, a charging area 216 and a plurality of charging electrodes 210. The plurality of charging electrodes 210 may be embedded into the charging area 216. The plurality of charging electrodes 210 may have different sizes and/or shapes so as to accommodate various mobile devices (e.g., cellular phones, tablets, e-readers, etc.). The charging electrodes 210 may receive power from the charging kiosk 215.

Figure 13A:
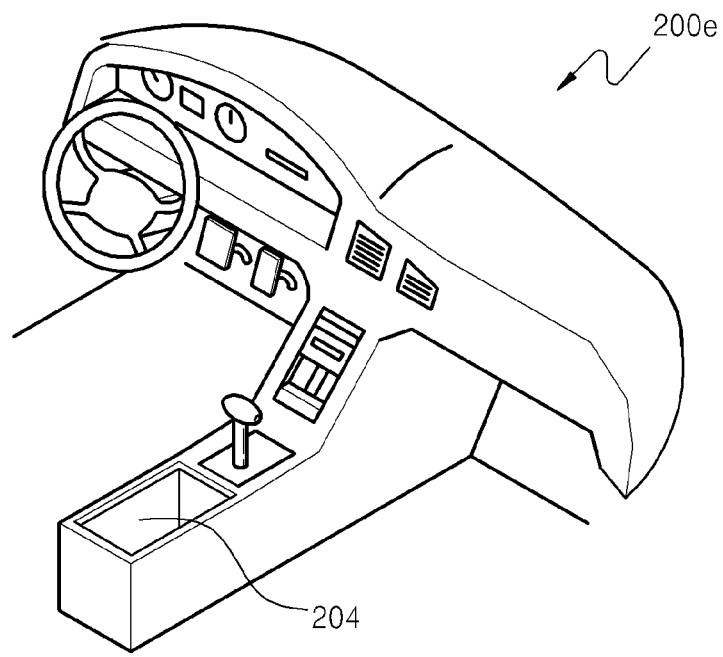
Figure 13B:
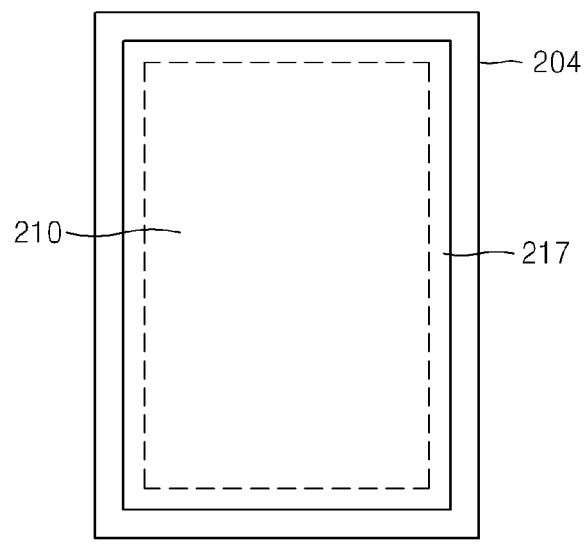

FIGS. 13A and 13B show a charging device 200e according to at least one example embodiment. FIGS. 13A and 13B show an implementation of the charging device 200e as part of an automobile. For example, FIG. 13A shows an automobile with a center console 204. FIG. 13B shows a plan view of the center console 204, wherein the center console 204 includes a flat surface 217. A charging electrode 210 may be embedded into the flat surface 217. The charging electrode may receive power from, for example, a battery of the automobile.

Although FIGS. 9-13B show a single charging electrode 210, it should be understood that example embodiments are not limited thereto. For example, each of the charging devices 200a-200e may include more than one charging electrode (e.g., two electrodes 212 and 214 placed side-by-side as shown in FIG. 5D)

In order to implement wireless charging, in addition to an existing antenna, an electrode for charging needs to be embedded in an electronic device. However, when the electrode for charging is embedded in an electronic device, the volume of the electronic device is increased and a parasitic capacitance results from other electrodes in the electronic device. According to at least one example embodiment, however, since the outermost electrodes in the electrodes of the display device are used as electrodes for charging, no additional electrode for charging is required.

According to at least one example embodiment, since wireless charging is performed using the electrodes of a display panel, no additional component for charging is required.

It should be understood that the exemplary embodiments described therein should be considered in a descriptive sense only and not for purposes of limitation. For example, while the above description relates to wirelessly charging a display device, example embodiments may also relate to wireless data transfer between two devices. Descriptions of features or aspects within each example embodiment should typically be considered as available for other similar features or aspects in other example embodiments.

What is claimed is:

1. A display device comprising:
a display panel including at least one electrode, the at least one electrode being an outermost electrode among a plurality of electrodes of the display panel such that the at least one electrode configured to at least one of (i) apply a common voltage to the display panel, and (ii) sense a touch on the display panel;
a panel driving unit configured to drive the display panel based on a voltage applied to the at least one electrode;
a power storage unit configured to store power received through the at least one electrode; and
a switching unit configured to operatively connect the at least one electrode with at least one of the panel driving unit and the power storage unit based on an electric field around the at least one electrode,
such that the switching unit operatively,
connects the at least one electrode to the power storage unit, if the electric field around the at least one electrode is greater than or equal to a first electric field reference value, and
disconnects the at least one electrode from the power storage unit and connects the at least one electrode to the panel driving unit, if the electric field around the at least one electrode is less than a second electric field reference value, the second electric field reference value different from the first electric field reference value.

2. The display device of claim 1, wherein the at least one electrode includes a first electrode and a second electrode spaced apart from the first electrode.

3. The display device of claim 1, wherein the panel driving unit includes a voltage generating unit configured to apply a common voltage to the at least one electrode.

4. The display device of claim 1, wherein the panel driving unit is configured to sense a voltage change of the at least one electrode to detect a position of the touch.

5. The display device of claim 1, wherein the at least one electrode includes a plurality of first electrode cells and a plurality of second electrode cells, the plurality of first electrode cells formed in a row line along a first direction, the plurality of second electrode cells formed in each column line along a second direction intersecting the first direction, the second electrode cells alternately disposed with the first electrode cells.

6. The display device of claim 1, further comprising:
a sensor configured to sense the electric field around the at least one electrode, wherein the switching unit is further configured to operatively connect the at least one electrode to at least one of the display panel and the power storage unit based on output of the sensor.

7. The display device of claim 6, wherein the second electric field reference value is a voltage threshold value associated with the power storage unit.

8. The display device of claim 1, wherein the display panel includes,
a first substrate including a source line, a gate line, and a pixel electrode, the source line and the gate line connected to the panel driving unit;
a second substrate including the at least one electrode; and
a display material between the first substrate and the second substrate.

9. A charging system, comprising:
the display device of claim 1; and
a charging device configured to generate the electric field.

10. The charging system of claim 9, wherein the charging device includes a charging electrode configured to generate the electric field.

11. The charging system of claim 10, wherein the charging electrode is a thin film type electrode.

12. The charging system of claim 10, wherein a surface area of the charging electrode is greater than a surface area of the at least one electrode.

13. The charging system of claim 10, wherein the charging device further includes a first compensation circuit configured to compensate for a resistance of a capacitive structure formed by the at least one electrode and the charging electrode.

14. The charging system of claim 13, wherein the first compensation circuit includes an inductor.

15. The charging system of claim 13, wherein the display device further includes a second compensation circuit configured for impedance matching of the charging device and the display device.

16. The charging system of claim 15, wherein the second compensation circuit includes at least one of an inductor and a capacitor.

17. A display device, comprising:
a display panel including at least one electrode, the at least one electrode being an outermost electrode among a plurality of electrodes of the display panel such that the at least one electrode configured to at least one of (i) apply a common voltage to of the display panel, and (ii) sense a touch on the display panel;

a panel driving unit configured to display an image on the display panel based on a voltage applied to the at least one electrode;

a power storage unit, the at least one electrode being configured to supply a voltage to the power storage unit; and a control architecture configured to operatively connect the at least one electrode with at least one of the panel driving unit and the power storage unit based on an electric field around the at least one electrode, such that the control architecture operatively, connects the at least one electrode to the power storage unit, if the electric field around the at least one electrode is greater than or equal to a first electric field reference value, and disconnects the at least one electrode from the power storage unit and connects the at least one electrode to the panel driving unit, if the electric field around the at least one electrode is less than a second electric field reference value, the second electric field reference value different from the first electric field reference value.

18. The display device of claim 17, wherein the control architecture includes, a sensor configured to sense the electric field around the at least one electrode, a user interface configured to receive a user command, a switching unit configured to selectively electrically connect the at least one electrode to at least one of the panel driving unit and the power storage unit, and a control unit configured to control the switching unit based on at least one of the sensed electric field and the user command.

19. The display device of claim 17, wherein the control architecture is further configured to, detect a voltage level of the power storage unit, and control the electrical connection of the at least one electrode based on the detected voltage level.

20. A method of operating a display device, comprising:

detecting an electric field around at least one electrode of a display panel, the at least one electrode being an outermost electrode among a plurality of electrodes of the display panel such that the at least one electrode configured to at least one of (i) apply a common voltage to the display panel, and (ii) sense a touch on the display panel, the display panel configured to display an image based on a voltage applied to the at least one electrode;

connecting the at least one electrode to a power storage unit, if the electric field around the at least one electrode is greater than or equal to a first electric field reference value;

disconnecting the at least one electrode from the power storage unit and connecting the at least one electrode to the display panel, if the electric field around the at least one electrode is less than a second electric field reference value, the second electric field reference value different from the first electric field reference value; and storing power in the storage unit when the at least one electrode is operatively connected to the power storage unit.

\* \* \* \* \*